United States Patent [19]

Lepper

[11] 4,110,583
[45] Aug. 29, 1978

[54] EARPHONE CONSTRUCTION

[76] Inventor: Wilhelm Lepper, Berghaus Heckenfels, 5340 Bad Honnef a, Rhein, Fed. Rep. of Germany

[21] Appl. No.: 654,906

[22] Filed: Feb. 3, 1976

[30] Foreign Application Priority Data

| Feb. 3, 1975 | [DE] | Fed. Rep. of Germany | 2504362 |
| Feb. 4, 1975 | [DE] | Fed. Rep. of Germany | 2504540 |
| Feb. 19, 1975 | [DE] | Fed. Rep. of Germany | 2507043 |
| Mar. 11, 1975 | [DE] | Fed. Rep. of Germany | 2510459 |
| Mar. 25, 1975 | [DE] | Fed. Rep. of Germany | 2513053 |
| Apr. 9, 1975 | [DE] | Fed. Rep. of Germany | 2515442 |

[51] Int. Cl.² .................... H04M 1/05; H04R 5/00
[52] U.S. Cl. .................... 179/156 R; 179/182 R
[58] Field of Search .................... 179/156 R, 157; 181/182

[56] References Cited

U.S. PATENT DOCUMENTS

| 1,554,119 | 9/1925 | Morgan | 179/157 |
| 1,696,304 | 12/1928 | Hutchison | 181/182 |
| 1,784,596 | 12/1930 | Hutchison | 181/182 |
| 3,592,978 | 7/1971 | Hess | 179/156 R |
| 3,609,240 | 9/1971 | Fixler | 179/182 R X |
| 3,863,028 | 1/1975 | Fixler | 179/182 R X |
| 3,939,310 | 2/1976 | Hodges | 179/156 R |

*Primary Examiner*—William C. Cooper
*Attorney, Agent, or Firm*—Toren, McGeady and Stanger

[57] ABSTRACT

In an earphone construction an axially extending tubular shaped member forms a passageway or listening channel with an ear opening located between the ends of the member. A sound source is positioned in the passageway, spaced from the ear opening, for directing sound in the axial direction of the tubular member so that it flows past the ear opening. The tubular member can be U-shaped forming a headset with two ear openings or separate tubular members each with an ear opening can be joined together by a band or the like to form a headset. The ear openings can have different shapes and additional sound outlet openings, spaced from the ear openings, can be provided in the tubular member. If a U-shaped tubular member is used, the passageway between the ear openings can be open, restricted by a movable throttle or blocked by a wall.

25 Claims, 31 Drawing Figures

EARPHONE CONSTRUCTION

SUMMARY OF THE INVENTION

The present invention is directed to an earphone construction and, more particularly, it concerns an earphone where the sound source is positioned within an axially extending passageway so that the sound is directed generally along the passageway past an ear opening spaced axially from the sound source.

Earphones used to date only transmit to the ear that which is being received in the foreground, that is, they do not supply any of the background sound in the room where the sound is being recorded. Further, such earphones cannot transmit both foreground and background sound if the microphone only records the foreground sounds. A microphone mounted in an artificial head could record both sources of sound, since the ears of the artificial head can listen almost spatially as can human ears to the whole spatial sound. Such recording is only approximately possible in quadriphonics.

Unfortunately, the various sounds received by the artificial head are pressed by conventional earphones in the same axial direction into the listener's ears giving the impression that the total spatial sound originates from the rear.

The primary object of the invention is to provide an earphone construction which overcomes the drawbacks experienced in conventional earphones by reproducing the recorded sounds so that they are directed to the ear essentially from a position forward of or in front of the ear. In other words, the sound is directed in much the same manner as it would be listened to under normal conditions. Further, the construction of the earphone also permits the sound received by the artificial head from the rear to be listened to in a correct manner. As a result, the total sound image received by the artificial head, that is, the total image as obtained from a normal stereo transmission or record or stereo tape, arrives at the ear as if an expensive quadraphonic receiving technique or quadriphonic listening apparatus has been used.

Essentially, this novel and spatially correct hearing device is obtained by positioning the sound source not opposite the ear as in a conventional earphone but spaced forwardly of or adjacent to the ear such as within a tubular shaped member having an ear opening intermediate its ends with the sound source spaced axially from the ear opening. In one such arrangement a U-shaped tubular member providing an earphone headset, provides the sound sources at each end of the U-shaped member so that the passageway or listening channel through the member joins the sounds from the sound sources acoustically around the listener's head.

If a U-shaped member is used its legs are advantageously oriented in a somewhat inclined position so that the natural main direction of sound to the ears can be taken into account. A partial sound communication takes place within the listening channel in the tubular member, as is also accomplished in quadraphonics, in two front loudspeakers by special measures. The background effect of a quadraphonic system is afforded within the listing channel by guiding the recorded sound around the head of the listener.

As one listens at the ear opening into the tubular member, the sound from the sound source flows within the listening channel past the ears or passes into the inner ear.

It is preferred if the listening channel or passageway within the tubular member is formed of a damping material. A hard foam material, such as a foam or aerated plastic material, is particularly advantageous as the material for the earphone tubular member since it affords the desired damping effect and does not reverberate. Further, such material is very light-weight and has been used in conventional earphones. The wall thickness of the earphone is approximately 6–7 mm.

The cross sectional area of the passageway or listening channel through which the sounds flow does not have to be very large, the optimum size and shape of the cross section can be quickly ascertained by experiment. Various shapes can be used for the cross section, for instance, rectangular, round, oval and the like.

Where a U-shaped tubular member forms the earphone construction with a pair of ear openings in the opposite legs of the U-shaped member, the passageway extending between the ear openings can be fully open or it may contain a movable throttle or damper in the passageway between the ear openings for affording the optimum communicating effect within the passageway. In place of a damper which can be opened or closed as required, a rigid wall can be positioned across the passageway in the tubular member dividing it into a pair of sub-passageways. Each sub-passageway contains a sound source which can be provided, in part, with the sound supplied to the other sub-passageway. In each of the sub-passageways the sound passing over the ear openings consists of the sound arriving from the sound source at the front end of the sub-passageway and reverberations travelling from the rear portion of the sub-passageway over the ear openings.

For a quadraphonic system, sound sources can be located in each of the sub-passageways at the wall which separates the passageway in two. Accordingly, the sound sources mounted on each side of the separating wall provide the background recordings for each sub-passageway.

Instead of a U-shaped tubular member, two separate tubular members can be used secured together into a headset by means of a connecting strap. Where separate tubular passageways are used, they have the general configuration of the legs of the U-shaped members.

In a U-shaped member communication between the legs each containing an ear opening can be controlled by positioning a cross wall passageway with an opening through it instead of using a throttle or damper. Furthermore, the sound communication between the opposite legs of the member can be controlled by narrowing the bight portion of the U-shaped member as compared to the leg portions.

Generally, in using a U-shaped tubular member the bight portion extends around the back of the head, however, it could also be arranged to extend around the front of the head. Moreover, an endless conduit could be afforded extending completely around the head with ear openings or it could be arranged to rest on the head with outlets extending downwardly to the ears.

To improve the quality of the sound from the earphones, the opposite ends of the leg portions of the U-shaped member from the sound sources can be provided with openings. Similarly, if two separate tubular members are used which are held together by a clip or strap, the opposite ends of each member from the sound source can be left open. The use of such openings has the effect that the sound becomes more transparent and less dull.

If the bight portion of the U-shaped member extends around the front of the head, then one or more intermediate walls can be provided in the bight portion dividing it into separate passageways each containing one of the leg portions of the member. In such an arrangement to provide the sound emanating from sources located forwardly of the ear openings, the sound sources can be mounted on the walls in the bight portion for directing the sound generally in the axial direction of the sub-passageways formed.

In place of a tubular shaped member forming a passageway or listening channel for the sound, a support can be provided to fit around the head or neck of a listener with a pair of sound sources or radiators attached to the support and spaced a distance from forwardly and rearwardly of the ear. Accordingly, the sound does not pass through a tubular passageway but it is directed angularly at the ear from a forward and rearward position. The sound sources or members which support them can be movably positionable on a ring-shaped support for the earphones.

Where one or more tubular members form an earphone headset, the passageways containing the sound sources or transmitters can be formed telescopically.

Where the sound sources are positionable on a support ring or the like, they can be disposed in movably positionable sound funnels for selectively orienting the funnels relative to the ear.

To vary the effect of the sound directed through the listening channels in the tubular members, the sound sources can be pivotally mounted for movement about an axis extending transversely of the axis of the listening channel. Accordingly, the sound sources can be pivoted to direct sound toward the walls of the listening channel opposite the ear opening, directly along the axis of the listening channel or toward the ear opening from the channel.

While the sound source or emitter can be formed as a permanent part of the earphone, it is also possible for them to be removably mounted in the tubular members forming the sound or listening channels. Various means can be employed for holding the sound sources in the tubular member, for instance, clips can be provided or, if the tubular members are formed of an elastic material an opening formed for the sound sources in such material will effect the desired securement. If the earphone material is not sufficiently elastic, an elastic liner can be provided in the opening for the second source so that it is held in position. With this arrangement the sound emitters can be exchanged, as required.

When two separate tubular members are connected together to form the earphone headset, it is preferred if the tubular members are maintained as short and compact in the axial direction as possible. In such an arrangement the sound sources or emitters are located closely ahead of the ear and are oriented relative to the ear so that the direction of the sounds emitted travels at or close to right angles to the ear. Further, the tubular member is shaped providing an ear opening which permits the tubular member to fit tightly to the head behind the ear. When viewed in horizontal longitudinal section mounted on the listener's head, the tubular member appears to have a wedge-shaped form.

To improve the sound reception afforded by the earphone, it can be provided with perforations close to the rear end of the tubular member, that is the end which fits closely against the head behind the ear. Such perforations are provided on the opposite side of the tubular member from the ear opening and slightly behind the ear. If the earphone construction is to be used in a quadriphonic system, small reflective sound sources can be placed in the tubular members rearwardly of the ear openings and preferably on the opposite side of the tubular member from the ear opening, since the shape of the tubular member for effecting a close fit to the head does not afford any appreciable surface rearwardly of the ear on the same side of the tubular member and the ear opening.

To provide a particularly clear sound effect from the sound emitters located forwardly of the ear within the tubular members, it is advantageous if the ear or listening openings extend in the axial direction of the tubular member and toward the sound emitters to an extent that the openings are only partly covered by the ear. In other words, the dimension of the listening openings in the axial direction of the tubular member is greater than a normal ear measured in the same direction. The ear openings may have a variety of shapes, for instance, triangular or trapezoidal with the axially extending sides of such shapes diverging in the direction towards the sound emitter. Additionally, the ear openings can be in the form of a rectangle.

To enhance the sound effect afforded by this earphone construction, sound outlet openings can be provided in the sides of the tubular member between the sound emitters and the ear openings. Such sound outlet openings can have different shapes and may have diverging sides in the direction of the sound emitters.

These ear openings and sound outlet openings improve the foreground effect of the sound directed through the tubular member, because the sound passing over the ear openings can, in part, exit and pass around the head to the other ear opening. As a result, a mixing effect is obtained.

It is important that the walls of the passageways or listening channels within the earphones be insulated in a soundproof manner unless the tubular members are formed of a soundproof material. Any portion of the listening channel ahead of the sound sources should also be soundproofed. The outlet portions of the listening channels, that is, the parts of the channels downstream of the ears from the sound sources should be closed wholly or in part with the opposite walls disposed in a converging manner. The opposite walls can be frustoconical or in the form of a frustum of a pyramid. Further, the converging shape of the walls of the tubular member can be made to commence at the location of the sound sources.

As mentioned above, it is advantageous in the type of earphone construction just described if the structure of the tubular members is such that the sound sources or emitters can be easily replaced.

Under certain circumstances it might be desirous to increase the volume of the base frequencies using the earphone constructions set forth above. This is achieved by adding additional sound sources or emitters which only transmit the base frequencies. Such additional sound sources are mounted in the tubular member on the side opposite the ear opening so that they are in alignment with the ear. In this arrangement, because of the round wave character of the base frequencies, the sound transmitted from the foreground toward the ear is not influenced. The earphones can be held on the head of a listener by means of a bow-shaped member or a light strap. Moreover, if a U-shaped tubular member is used, a tension spring can be inserted into the U-shaped part which presses the ear openings against the sides of the head. Considering the known means for securing earphones to the head it can be appreciated that other devices for support members can be used. Further, the means for mounting the earphones on a listener's head can be adjustable.

In another and preferred embodiment of the invention the sound is supplied to the listener's ear from two different sources each located on a frame supported on the listener's head. One source is positioned forwardly of the listener's ear pivotally supported on an arm so that its angular position can be varied relative to the axis through the listener's ear. The other source is mounted in a housing or distance piece opposite the ear and separate from the one source. This other source, used for supplying bass frequencies can be aligned with the axis through the listener's ears or oriented at a slight angle to the axis.

The sound from the forward source passes to the ear through an opening in the housing or distance piece containing the bass frequencies source. The sound from the forward source is directed over or past the ear rather than into it, much in the same manner that sound ordinarily reaches the ear of a listener. The sound source providing the bass frequencies does not determine sound direction and, accordingly, does not disturb the directionality of the sound from the forward source. Both of the sound sources associated with one ear are mounted on a frame so that their distance from and direction relative to the ear can be varied.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
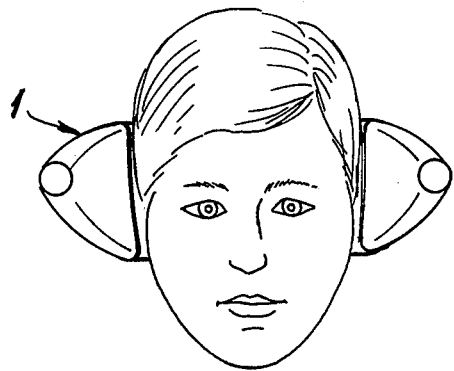
FIG. 1 is a front view of an earphone construction embodying the present invention positioned on a listener's head.
Figure 2:
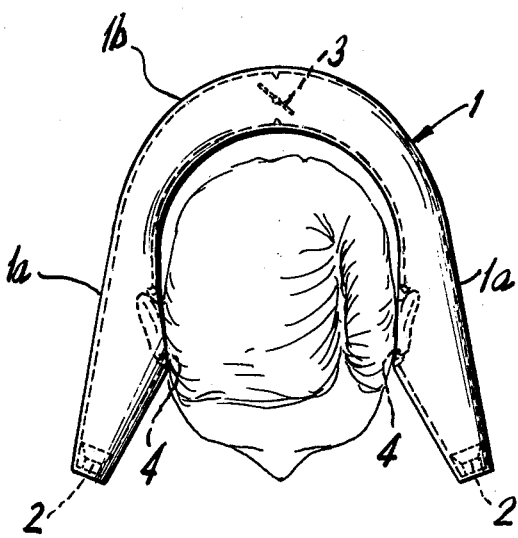
FIG. 2 is a top view of the earphone construction shown in FIG. 1.

In FIG. 1 an earphone headset is shown on a listener's head. As can be seen in FIG. 2, viewed from the top, the earphone headset consists of a U-shaped tubular member which fits around the back of the listener's head. The tubular member forms a passageway or listening channel extending through its leg portions 1a and the bight portion 1b interconnecting the leg portions. Within the passageway at the free ends of each of the leg portions, that is, the ends located forwardly of the listener's ears, a sound source or emitter 2 is positioned.

As can be noted in FIGS. 1 and 2, the passageway within the tubular member 1 extending from the free end or sound emitter end of the leg portions has the opposing walls in diverging relationship at least to the points of the openings 4 into which the listener's ears are placed.

At about the midpoint of the bight portion 1b a movable throttle or damper 3 is provided for regulating the passage of sound from one leg portion 1a into the other.

The sound emitters 2 are positioned in the U-shaped listening channel formed by the member 1 so that the sound is directed generally in the axial direction of the channel. The sound passes from a point forwardly of the listener's ears through the leg portions 1a rearwardly of the listener's ears and then through the bight portion 1b with the mixing of sound from the two emitters 2 being mixed in accordance with the extent the damper 3 is opened. Accordingly, sound is directed through the listening channel past the listener's ear not only from the sound emitter adjacent the listener's ear but from the other leg of the U-shaped channel so that both a foreground and a background sound effect is provided. If the damper 3 is closed then the sound flowing past the listener's ear is deflected back toward his ear because the passageway is closed.

Preferably, the U-shaped tubular member is formed of a hard foam or aerated plastic material. Advantageously, the wall thickness of the tubular member is about 6-7 mm. While the listening channel through the U-shaped member 1 appears to be rectangular in transverse cross section, other sections may be selected based on experiment. The optimum size and shape of the transverse cross section of the tubular member can be determined by trial.

The sound sources 2 are oriented within the free ends of the leg portions 1a so that they direct sound toward the listener's ear in the same general direction as it would travel in a normal listening situation. Generally speaking, the sound passes through the listening channel approximately parallel to the plane of the opening to the listener's ear or at a slight angle to the plane.

Figure 3:
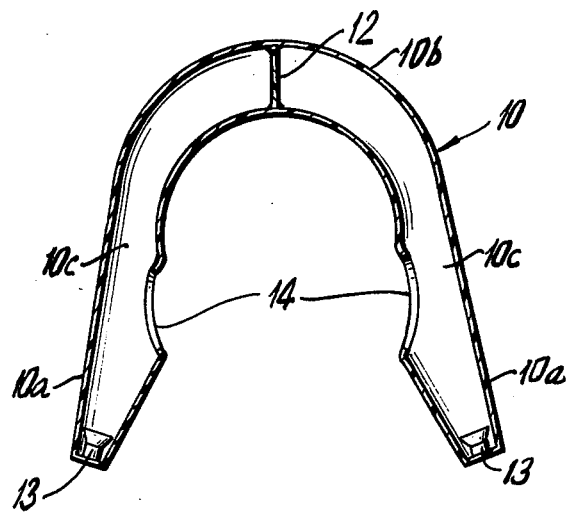
FIG. 3 is a top view, in section, of another embodiment of the earphone construction according to the present invention as shown in FIG. 1.
Figure 4:
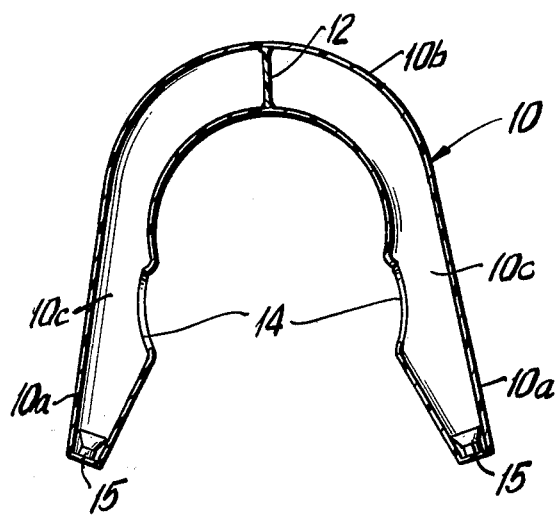
FIG. 4 is a sectional view, similar to that shown in FIG. 3, illustrating another embodiment of the present invention.
Figure 5:
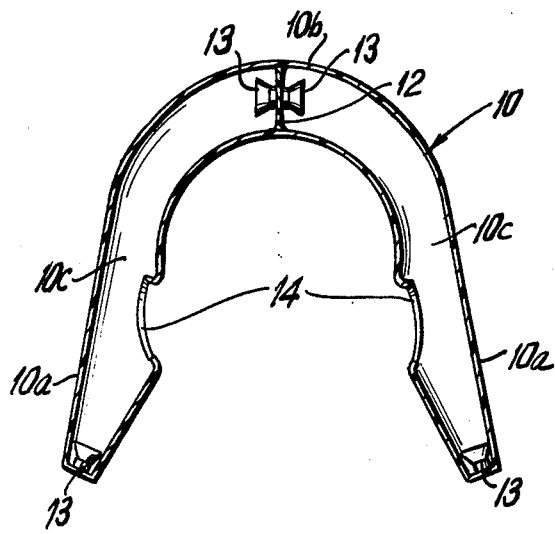
FIG. 5 is sectional view, similar to that shown in FIGS. 3 and 4, showing yet another embodiment of the present invention.

In FIGS. 3, 4 and 5 a U-shaped tubular member 10 is shown, generally similar to the construction shown in FIGS. 1 and 2, however, a rigid separation wall is positioned midway along the bight portion 10b of the member dividing its interior into two separate sub-passageways 10c. Each sub-passageway 10c extends from the wall 12 to the free end of one of the leg portions 10a of the member. At the end of each sub-passageway 10c spaced from the wall 12, a sound source 13 is provided for directing sound in the general axial direction of the sub-passageway passed an ear opening 14 located roughly midway along the leg portion 10a.

In FIG. 3 the sound passes through each of the sub-passageways 10c past the associated ear opening 14 with sound being directed back toward the ear from the wall 12.

The structure of the earphone headset is the same in FIGS. 4 and 5 as in FIG. 3 except that in FIG. 4 the sound sources 15 replace the sound sources 13. The sound sources 15 are each associated with a respective part of the sound transmitted to the other source so that a mixed sound effect is supplied to each of the sub-passageways 10c for flow past the ear openings 14. In FIG. 5, in addition to the provision of the sound sources 13 at the forward end of each of the sub-passageways 10c, an additional sound source is mounted on the dividing wall 12 for directing sound in the axial direction forwardly from the rear part of the head.

Figure 6:
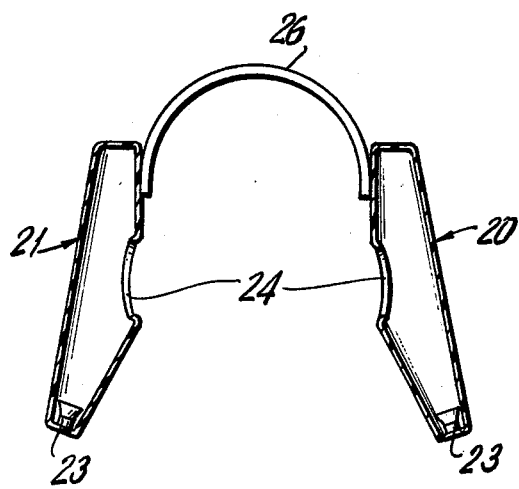
FIG. 6 is a sectional view taken in the same plane as in FIGS. 3-5 and exhibiting still another embodiment of the present invention.

In FIG. 6, instead of a single U-shaped tubular member the earphone headset consists of two tubular members 20, 21 each arranged to be positioned along an opposite side of a listener's head. A strap 26 interconnects the two tubular members and is intended to extend around the back of the listener's head and to hold the tubular members in place. The tubular members 20, 21 have generally the same shape as the leg portions 10a of FIGS. 3-5. Each tubular member has a sound source 23 at its forward end and its rearward or opposite end is closed. Along each side of the tubular members adjacent the listener's head and approximately midway between its ends is an ear opening 24. As in FIGS. 3-5 the sound sources 23 direct the sound in the axial direction of the tubular members 20, 21 so that it tends to flow past the listener's ear in the same general direction as the sound would flow in a normal listening situation.

Figure 7:
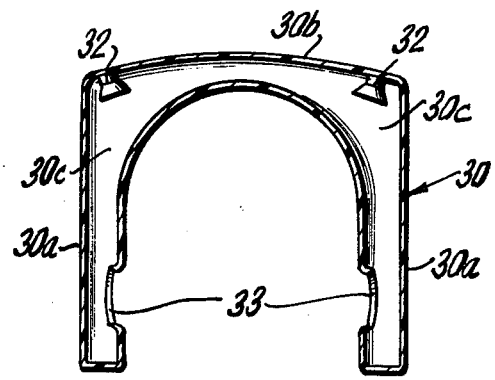
FIG. 7 is a sectional view similar to that shown in FIG. 3 of another embodiment of the present invention.
Figure 8:
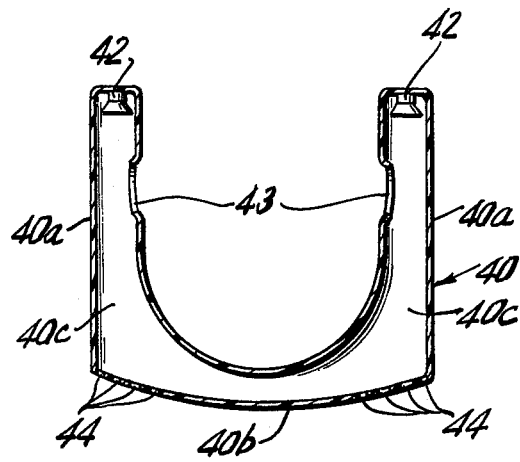
FIG. 8 is a view similar to that shown in FIG. 7, of still another embodiment of the present invention.
Figure 9:
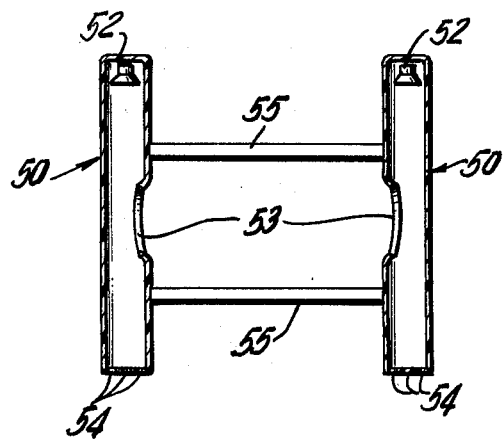
FIG. 9 is a sectional view taken in the same general plane as FIGS. 7 and 8 and indicating a further embodiemnt of the present embodiment of the present invention.

In the description of FIGS. 7, 8 and 9 the word "front" indicates the front of the earphone construction corresponding to the front of the listener's head.

In FIG. 7 a U-shaped tubular member 30 is illustrated with its leg portions 30a interconnected by a bight portion 30b which extends across the front portion of the tubular member. Within the U-shaped passageway or listening channels 30c formed by the tubular member 30 a pair of sound sources 32 are provided. The sound sources are located one at each of the opposite ends of the bight portion 30b where it connects with the ends of the leg portions 30a. The sound sources 32 are mounted on the walls of the bight portion and are arranged to direct sound generally along the axial direction of the leg portions. Within each leg portion there is an ear opening 33. The free ends of the leg portions 30a are closed and are located close to and rearwardly of the ear openings 33. Accordingly, sound is directed into the passageway provided by each of the leg portions and, since the rear end of each leg portion is closed sound is directed back toward the bight portion. The bight portion 30b is open, though it has a reduced cross section at its midpoint as compared to its ends, so that mixing of the sound from each of the leg portions 30a takes place.

In FIG. 8 the U-shaped tubular member 40 has the same general shape as the member 30 in FIG. 7, however, its bight portion 40b is located at the back of the listener's head instead of in front of the listener's head as shown in FIG. 7. Again, the sound sources 42 are located in front or ahead of the listening openings 43 into the leg portions 40a of the tubular member. The sound sources 42 are oriented perpendicularly to a line drawn through the centers of each of the ear openings 43. The bight portion 40b is open connecting the leg portions 40a so that a continuous passageway 40c extends from one sound source to the other. As distinguished from the embodiment shown in FIG. 7, in FIG. 8 the walls of the bight portion aligned opposite the leg portions 40a have perforations 44 which act as sound outlet openings for making the sound more transparent and less dull. In this arrangement sound flows from each of the sound emitters 42 through the leg portions 40a into the interconnecting bight portion 40b. However, certain of the sound passes through the perforations 44 in the tubular member at the junction of each of the leg portions 40a with the bight portion 40b.

In FIG. 9 the earphone headset consists of a pair of straight tubular members 50 interconnected by a pair of straps 55 to form a headset which can fit a listener's head. The front of the listener's head and, accordingly, the front of the headset is indicated in FIG. 9 and a sound source 52 is located in each front end of the tubular members 50. Because of the tubular shape of the members, a passageway extends from the closed front end at which the sound source is located to a rear end which has perforations 54. About midway along each of the tubular members an ear opening 53 is provided so that sound directed from the emitters at the front end pass over the ear openings to the perforations or sound outlet openings 54 at the opposite ends of the tubular members. There is the similarity between FIGS. 8 and 9 in that the tubular member or members has sound outlet openings aligned with the sound sources and located on the opposite sides of the passageway through the tubular member or members from the ear openings.

Figure 10:
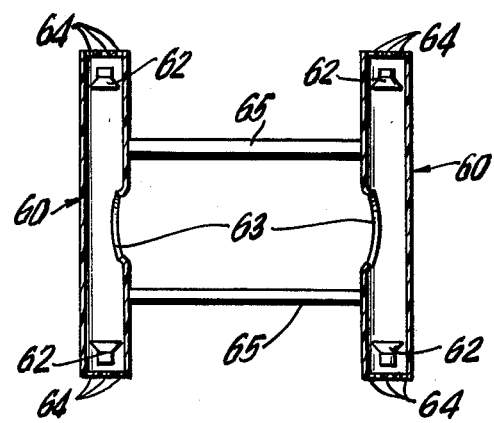
FIG. 10 is a sectional view similar to that shown in FIG. 9 illustrating another variation of the present invention.
Figure 11:
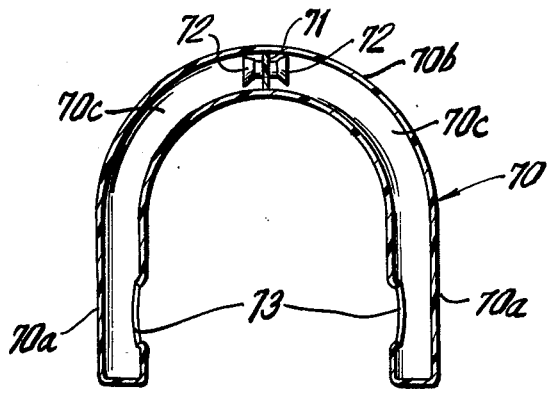
FIG. 11 is another sectional view generally similar to that shown in FIG. 3 and displaying a further variation of the present invention.

In FIG. 10 the general construction of the earphone headset is similar to that in FIG. 9 with the tubular members 60 being interconnected by straps 65 for mounting the headset on a listener's head. Each of the tubular members 60 is straight but unlike the arrangement shown in FIG. 9, a sound source 62 is located at each of the opposite ends of the tubular members for directing sound in the axial direction of the tubular member. Further, each of the ends of the tubular members is perforated to form sound outlet openings 64. Each tubular member 60 has an ear opening 63 located at a point intermediate its ends and the ear openings are in general alignment with respect to one another. In the arrangement of FIG. 10, sound is directed in the axial direction of each of the tubular members from the sound sources 62 flowing from front to back and back to front so that sound passes in both directions over the ear openings 63. In FIG. 11 a U-shaped tubular member 70 is illustrated with straight leg portions 70a joined together by a rounded bight portion 70b. As indicated in FIG. 11, the bight portion 70b is located at the front of the listener's head. Within the bight portion 70b, a separator wall 71 extends across the passageway formed by the tubular member and is divided into a pair of separate sub-passageways 70c. Mounted on each of the opposite sides of the separator walls 71 is a sound emitter 72 for directing sound generally in the axial direction of the sub-passageway 70c. The free ends of the leg portions 70a which are located toward the rear of the listener's head are closed. In each leg portion 70a, adjacent its rear end, is an ear opening 73. Sound is directed from the emitters 72 passing around the portion of the sub-passageways 70c within the bight portion 70b and then flowing along the bight portion 70a past the ear openings 73 and then being directed back toward the separator wall 71 by the closed free ends of each of the leg portions.

Figure 7A:
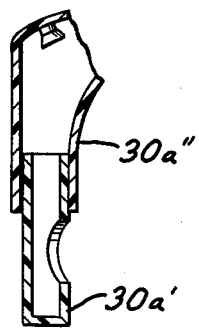
FIG. 7a is a sectional view of a portion of an earphone illustrating another embodiment of the present invention similar to the construction shown in FIG. 7.
Figures 12, 13:
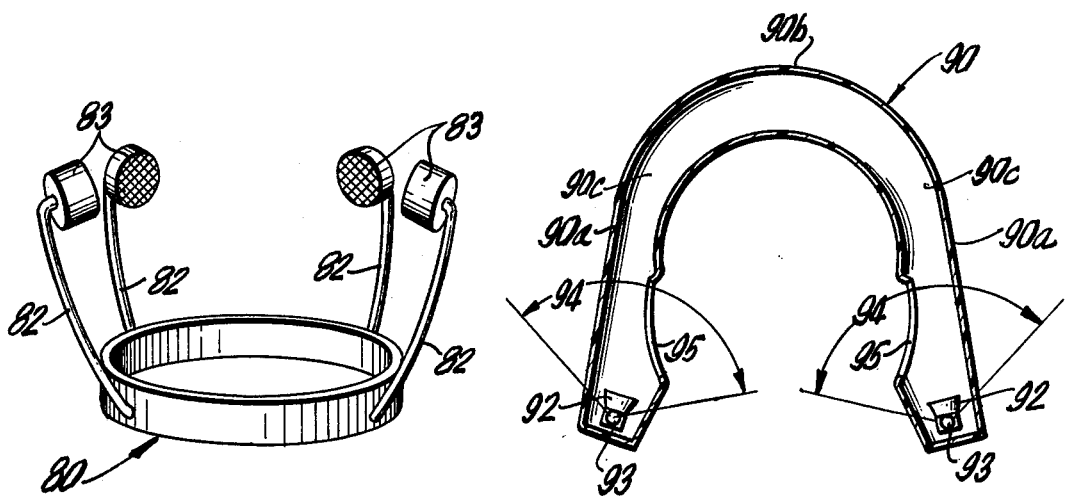
FIG. 12 is a perspective view of another construction of the earphone embodying the present invention.
FIG. 13 is a sectional view similar to that shown in FIG. 2 but indicating an alternate arrangement of the sound sources within the earphone.

In FIG. 12 another embodiment of the invention is shown where the tubular member is replaced by a ring-shaped member 80 and is arranged to be supported on a listener's body, for instance, the member 80 could be arranged about his neck or fitted on his head. On opposite sides of the member a pair of supports 82 are provided which in FIG. 12 extend upwardly from the member 80. At the upper ends of each of the supports is a sound source 83. The listener's ear would be located between the two sound sources 83 on the corresponding side of the ring. In other words, one sound source would be located forwardly of the listener's ear while the other one would be located rearwardly of his ear. Preferably, the sound sources would be spaced outwardly from the listener's ear. Though not shown, the sound sources 83 could be positioned in alignable or movable sound funnels for directing the sound toward the listener's ears.

Where tubular members are used to form the listening channels for flowing sound past the listener's ears, the tubular members can be constructed telescopically as shown in FIG. 7a. In FIG. 7a, the leg portion of the earphone consists of a first part 30a' telescopically inserted into a second part 30a".

In FIG. 13 the U-shaped tubular member 90 has the same general construction as shown in FIGS. 2-5, however, the passageway 90c extending through the leg portions 90a and the bight portion 90b is continuous from one end of the tubular member to the other, there is no divider or damper in the bight portion. The significant difference in this embodiment is the provision of a rotatable mount 93 for the sound emitters 92 positioned within each of the free ends of the leg portions 90a of the tubular member. Each of the sound sources 92 can be pivoted about its mount for an angular extent as indicated by 94. By pivoting the sound sources 92 different sound effects are transmitted to the adjacent ear openings 95. The range of pivotal movement 94 permits the sound source to be directed toward one or the other of the walls forming the leg portion 90a. Accordingly, the sound can be directed along a variety of paths from the sound source to the ear opening 95 and then around the passageway 90c to the other ear opening 95.

Figure 14:
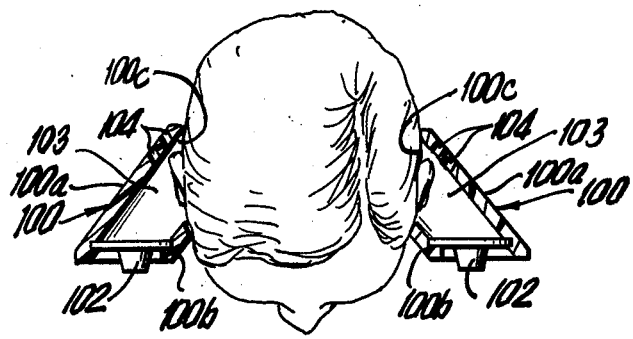
FIG. 14 is a top view, such as shown in FIG. 2, but shown in section, of yet another variation of the earphone construction embodying the present invention.

In FIG. 14 the earphone constructions consists of two separate tubular members 100. As viewed from top in FIG. 14 the tubular member has a generally wedge-shaped appearance with the side 100a of the tubular member spaced outwardly from the listener's head being considerably longer than the side 100b adjacent the listener's head. The tubular member is open at its end forwardly of the listener's ear and a sound source or emitter 102 is secured within the open end. The tubular member is formed of a suitably elastic material for securing the sound source within its open end. Alternatively, clips could be provided to fix the sound source to the end of the tubular member or an elastic liner could be provided if an inelastic material is used for the tubular member so that the sound source is securely held in place. With such an arrangement the sound source can be easily replaced. Not only can the sound source be replaced if defective or in need of repair, but also if a different sound source is required in accordance with the particular conditions involved.

The inner wall 100b of the tubular member which is located adjacent to the listener's head is cut out to form an ear opening 100c so that the tubular member can fit tightly against the listener's head and around his ear. Passageway 103 through the tubular member has its axis extending toward the listener's ear. However, the sound sources 102 are disposed approximately at right angles to the side of the listener's head, that is to the plane of the opening within which the listener's ear projects and, as a result, the axis of the passageway is disposed at an oblique angle to the sound source 102.

It is preferable, as shown in FIG. 14, for the passageway 103 formed by the tubular member 100 to be as short and as compact as possible. With this arrangement the tubular members can fit tightly around and behind the listener's ears.

The outer wall 100a of the tubular member has perforations or sound outlet openings 104 located just rearwardly of the listener's ear. Alternatively, small reflective sounds emitters for quadriphonic earphones could be placed at the location of the perforations 104.

In view of the orientation of the sound sources 102 relative to the walls 100a of the tubular members, the sound is directed toward the outer walls so that it passes through the passageway over the listener's ear rather than directly into it as in a conventional earphone. The perforations 104 permit the sound to pass out of the passageway.

When an elastic material is used in forming the tubular member it is advantageous in providing a tight fit for the earphone about the listener's ear.

Figure 15:
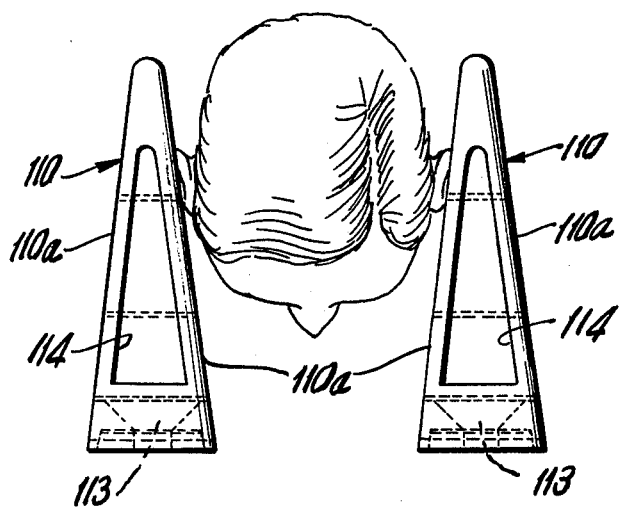
FIG. 15 is a view similar to FIG. 2 displaying a further arrangement of the present invention.

Another shape of the earphones embodying the invention is shown in FIG. 15. A pair of tubular members 110 are provided one on each side of the listener's head with the opposite sides 110a of the tubular member converging from the front end to the rear end of the tubular member. At the front end of each tubular member 110 is a sound emitter 113 for directing the sounds axially through the member. A sound outlet opening 114 is provided in the top side of each tubular member. The sound outlet openings have a triangular shape with the sides of the triangle diverging from the listener's ear forwardly toward the sound source 113. The sound outlet opening extends from the listener's ear almost up to the sound source. The ear openings are not shown in FIG. 15.

Figure 16:
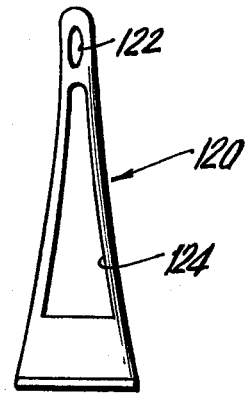
FIG. 16 is an alternate arrangement of the earphone construction shown in FIG. 15.

In FIG. 16 the side of a tubular member 120 which provides an earphone is shown which faces toward the listener's ear. An oval shaped ear opening is provided adjacent one end of the tubular member with the long or major axis of the oval opening extending in the axial direction of the tubular member. Between the ear opening 122 and the front end of the tubular member, that is, the lower end as viewed in FIG. 16, a sound outlet opening 124 is shown similar to that of the sound outlet openings in FIG. 15.

Figure 17:
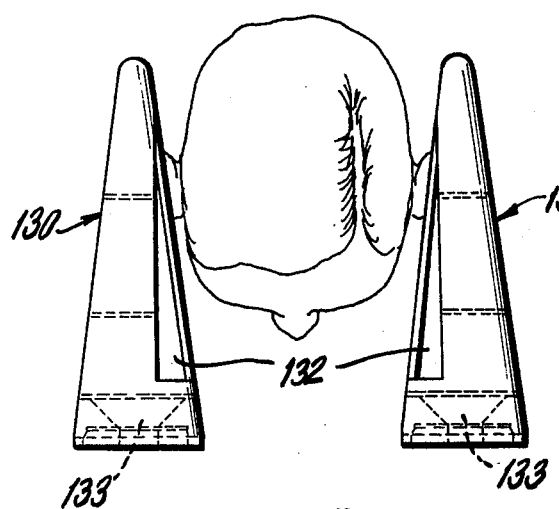
FIG. 17 is a view, similar to FIG. 15, of still another embodiment of the present invention.

In FIG. 17 a view similar to FIG. 15 is displayed with individual tubular members 130 forming earphones on the opposite sides of the listener's head. The ends of the tubular members 130 located forwardly of the listener's face each contain a sound source 133. Elongated ear openings 132 are provided in the sides of the tubular member facing toward the sides of the listener's head. These openings are elongated in the axial direction of the tubular members so that the listener's ear covers only a small rear portion of the opening. The remainder of the ear opening extends almost up to the sound source 133 at the front ends of the tubular members 130.

In FIGS. 18-25 a variety of individual tubular members for use as earphones are shown with different configurations of both the ear openings and the sound outlet openings.

Figure 18:
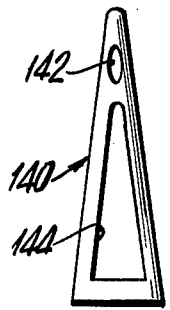
FIGS. 18-25 are side views of alternate embodiments of the present invention as illustrated in FIG. 17.

In FIG. 18 the side of a tubular member 140 directed toward a listener's ear is shown having an oval shaped ear opening 142 and a trapezoidally shaped sound outlet opening 144. Both of the openings 142 and 144 are elongated in the axial direction of tubular member 140.

Figure 19:
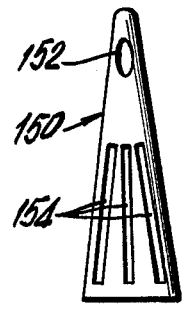

In FIG. 19 the ear opening 152 is similar to that in FIG. 18, however, a trio of sound outlet openings 154 are provided having an elongated rectangular shape. The long sides of the openings extend in the axial direction of the tubular member 150. The two outer sound outlet openings extend generally in parallel with the angularly disposed sides of the tubular member.

Figure 20:
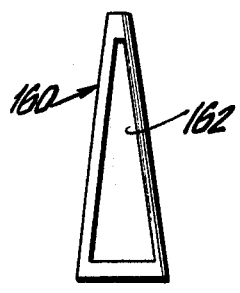

The side of the tubular member 160 which faces the listener's ear, as shown in FIG. 20, has a trapezoidally shaped ear opening 162 elongated in the axial direction of the tubular member. As shown in FIG. 17, the ear opening is of such a length in the axial direction of the tubular member that the ear only partially covers the opening, the remainder of the opening remains opened when it is placed against the side of the listener's head.

Figure 21:
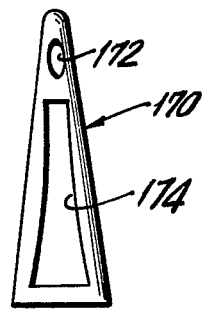

In FIG. 21 the tubular member 170 has an oval shaped ear opening 172 and a trapezoidally shaped sound outlet opening 174 with the sides of the sound outlet opening extending in the axial direction of the tubular member being concave.

Figure 22:
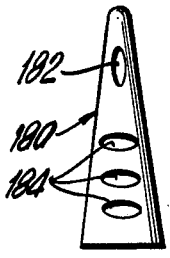

Another tubular member 180 is shown in FIG. 22 where both the ear opening 182 and the sound outlet openings 184 are oval shaped. While the long dimension of the ear opening extends in the axial direction of the tubular member, the long dimension of the sound outlet openings extends transversely of the axial direction of the tubular member.

Figure 23:
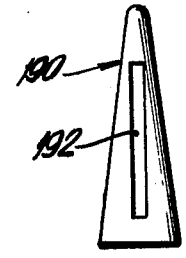

In FIG. 23 the tubular member 190 has an ear opening 192 in the shape of an elongated rectangle. This ear opening is of such a length that the listener's ear only covers a portion of the opening.

Figure 24:
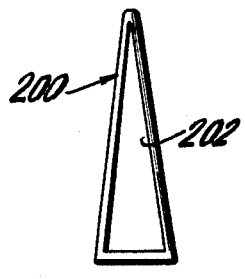

A similar arrangement of the ear opening 202 is shown in the tubular member 200 of FIG. 24, however, the ear opening 202 is triangular in shape with its sides diverging in the direction forwardly of the listener's ear, generally similar to the arrangement shown in FIG. 17.

Figure 25:
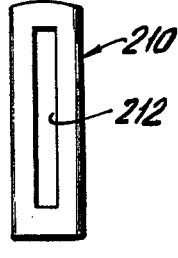

While FIGS. 18-24 show the opposite side of the tubular members diverging in the same general manner as shown in FIG. 17, in FIG. 25 the tubular member 210 has a generally rectangular shape with its elongated sides disposed in parallel. Similarly, its ear opening 212 has the shape of an elongated rectangle with the elongated sides of the rectangle disposed in parallel to the elongated sides of the tubular member. Accordingly, depending on the particular sound effect desired, the shape and arrangement of the ear opening and the sound outlet opening or openings can be provided within the tubular member forming the earphone.

Figure 26:
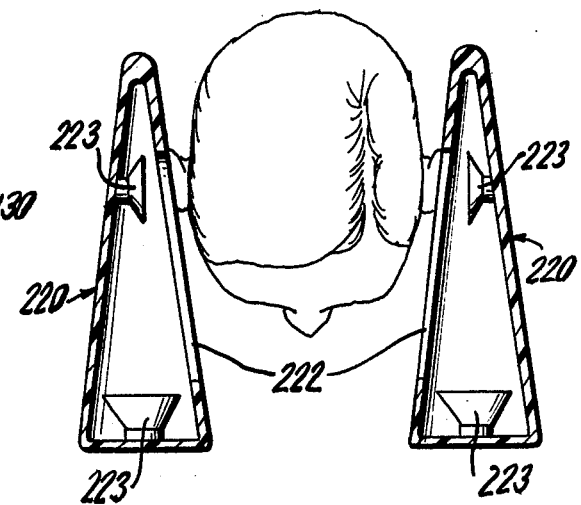
FIG. 26 is a view, generally similar to FIGS. 15 and 17, however showing the earphones in section and illustrating a further embodiment of the present invention.

In FIG. 26 the earphone headset consists of a pair of tubular members 220 each located on an opposite side of the listener's head with the tubular member extending forwardly of the listener's face. The tubular member, as viewed in FIG. 26, is triangular in shape with the elongated side walls diverging from rearwardly of the listener's ear to forwardly of his face. Further, the ear openings 222 in each of the tubular members 220 are elongated in the axial or elongated direction of the tubular members so that the listener's ear covers only a part of the ear opening. At the front end of each tubular member there is a sound source 223 for directing sound in the elongated direction of the tubular members 220 so that it is directed past the listener's ear. Since the ear openings 222 are open forwardly of the listener's ear, it is possible for sound to pass outwardly through these openings and to enter the opposite earphone.

On the side of the tubular member opposite the listener's ear and aligned with the rear end of the ear opening 222 is another sound source or emitter 223 selected for transmitting only the base frequencies. Such emitters are used to increase the volume of the base frequencies, if it is desired to do so. These sound emitters 223 located opposite the ear are arranged to direct sound substantially at right angles to the sound emitters located at the forward ends of the tubular members 220.

Figure 27:
FIG. 27 is a perspective view of an earphone of the general embodiment shown in FIG. 6.

In FIG. 27 an earphone headset similar to that shown in FIG. 6 is illustrated, however, the strap 26 is secured to the tubular members 20, 21 so that it extends over instead of around the back of the listener's head. Another distinguishing feature of this earphone headset is the provision of a C-shaped wedge-shaped piece 28 between each tubular member 20, 21 and the listener's ears. The piece 28 is open on the front side of the listener's ear forming a passage so that a correct stereophonic alignment is provided which permits the sound of the forward speaker to reach the ear in an improved manner. The piece 28 can be formed of any suitable acoustically compatible material.

Figure 28:
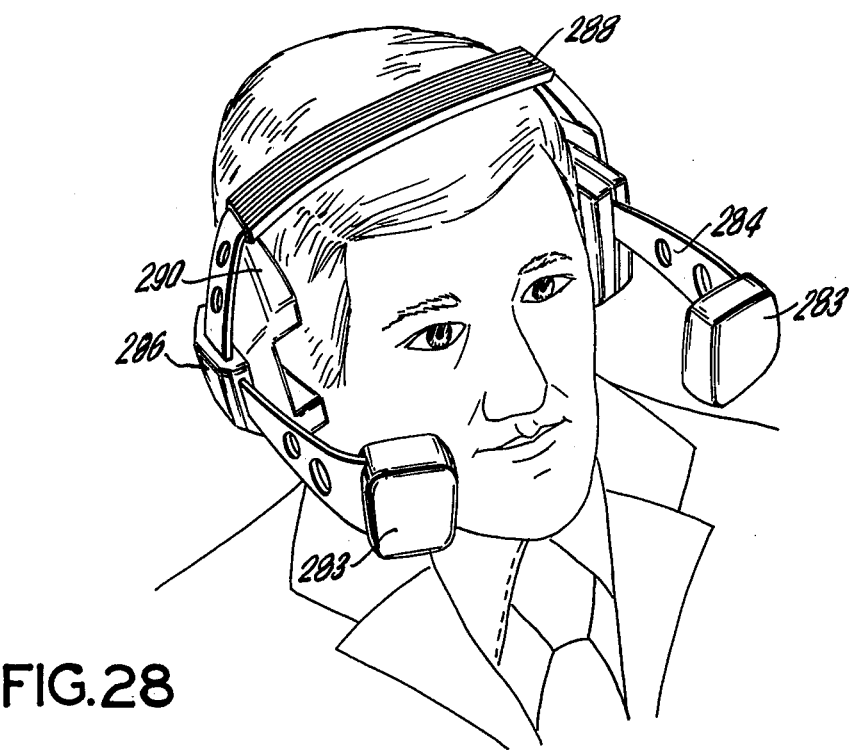
FIG. 28 is a perspective view of an earphone of the general embodiment shown in FIG. 12.

In FIG. 28 an earphone headset is illustrated which is of the same general type as shown in FIG. 12, that is, its sound sources 283 are mounted at positions spaced forwardly of the listener's ears and unlike the arrangements shown in the drawings, do not provide a closed tubular passageway for conducting the sound to an opening opposite the listener's ear.

Each sound source 283 is directed toward one of the listener's ears and is supported on the end of an arm 284 which projects forwardly from a support 286 which includes a strap 288 extending over the listener's head. As in FIG. 27 a C-shaped wedge-shaped piece 290 spaces the support 286 from the listener's ear and also provides an opening or channel facing toward sound source 283 through which sound can be directed into the ear affording correct stereophonic alignment.

Figure 29:
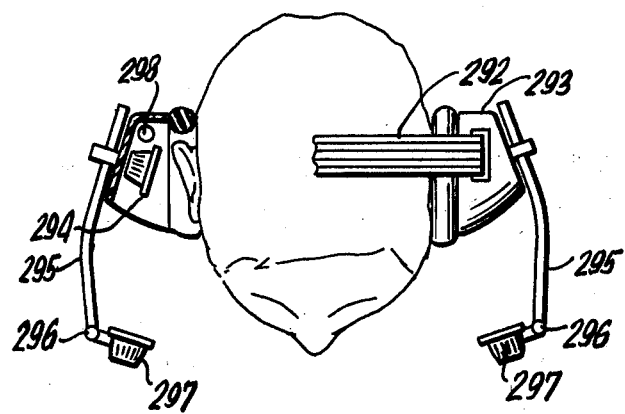
FIG. 29 is a top view of another earphone construction embodying the present invention.
Figure 30:
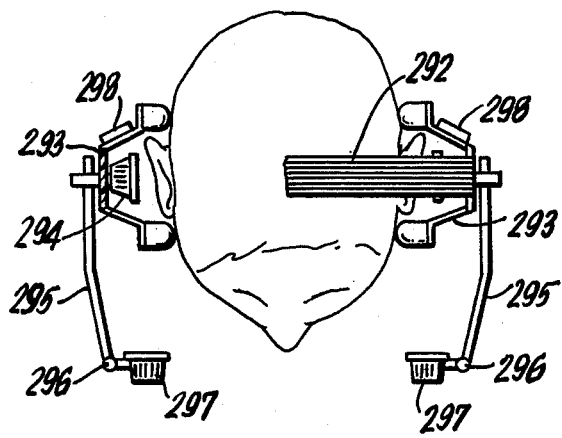
FIG. 30 is a top view and showing an earphone construction similar to that illustrated in FIG. 29.

In FIGS. 29 and 30 an earphone headset is illustrated consisting of head frame 292 positioned on a listener's head. Each side of the headset consists of a housing or distance piece 293 containing a sound source 294 for bass frequencies. The housing 293 spaces the sound source 294 from the listener's ear and the sound source is pivotally mounted in the housing for varying the direction at which the sound is directed toward the ear. In FIG. 29 the axis of the sound source is disposed at an acute angle to the axis through the listener's ears, however, in FIG. 30 the sound source for bass frequencies is in alignment with the axis through the listener's ears. Further, in FIGS. 29 and 30 the shape of the housing 293 is slightly different, in one (FIG. 29) the outer wall of the housing is approximately at right angles to the axis through the listener's ears while in the other (FIG. 30) the outer wall is at an acute angle to the axis. Though it is not shown in detail there is an opening in the housing directed toward the front of the listener's head to admit sound into the housing.

Support arms 295 are adjustably connected to and extend forwardly of the housings. Pivotally mounted at the forward end 296 of each arm is a main sound source 297 for middle and high frequencies. By pivoting the main sound source 297 the direction of the sound to the listener's ears through the openings in the housings can be adjusted. A frequency switch 298 is provided on each housing.

The arrangement in FIGS. 29 and 30 adjustably positions the sound sources for stereophonically adjusting the sound directed to the listener's ears. The sound directed from the sources forwardly of the listener's ears pass the ears in the normal direction of sound flow. Since the bass frequencies need a volume support they are located directly opposite the ear, but at a selected distance. The sound from the foreground is primarily based on middle and high frequencies and is not disturbed by the bass frequencies, because they are not direction determining.

While specific embodiments of the invention have been shown and described in detail to illustrate the application of the inventive principles, it will be understood that the invention may be embodied otherwise without departing from such principles.

What is claimed is:

1. Earphone construction to be worn on the head of the listener comprising a tubular shaped member forming an axially extending passageway having a first end and a second end spaced apart in the axial direction of said passageway, a first opening formed in the tubular member into said passageway and spaced between and from said first and second ends, said first opening arranged to be placed next to the listener's ear, and a sound source located in said passageway and spaced in the axial direction thereof from said first opening, said sound source being positioned in said passageway for directing the sound in the general direction of the axis of the passageway so that the sound travels across said first opening into said passageway.

2. Earphone construction, as set forth in claim 1, wherein said tubular member is bent into a U-shaped configuration arranged to fit around the head of a listener, said U-shaped tubular member consisting of a pair of legs and a bight portion interconnecting one end of each of said legs with a centerline extending through said legs and said bight portion, said passageway extending for the centerline length of said U-shaped member and having a portion thereof in each of said legs with a connecting portion in said bight portion, the first end of said passageway located at the end of one of said legs spaced along the centerline from said bight portion and the second end of said passageway at the end of the other one of said legs spaced along the centerline therein from said bight portion, the one of said legs having said first opening spaced between its ends, and the other of said legs having a second opening spaced between its ends and arranged to be placed next to the other one of the listener's ears and one sound source located in each of said legs with said sound source in one of said legs being located between said first opening therein and the end of said leg spaced from said bight portion and said sound source in the other of said legs being located between said second opening at the end of the other of said legs spaced from said bight portion.

3. Earphone construction, as set forth in claim 2, wherein said first opening in one of said legs and said second opening in the other of said legs are disposed in aligned relationship so that a line passing through the center of said first and second openings extends transversely of the portions of said passageway extending through said legs, and each portion of the centerline of said passageway extending through said legs is disposed at an oblique angle to the line passing through said first and second openings.

4. Earphone construction, as set forth in claim 3, wherein said sound sources are located at the ends of said legs spaced from said bight portion.

5. Earphone construction, as set forth in claim 2, wherein a damper is mounted in the portion of said passageway extending through said bight portion and said damper is displaceable between a closed position closing said passageway and a multiplicity of open positions for varying the extent of the opening through the portion of said passageway in said bight portion.

6. Earphone construction, as set forth in claim 2, wherein at least one wall extends transversely across the portion of said passageway in said bight portion and divides said passageway into two separate sub-passageways each containing one said sound source.

7. Earphone construction, as set forth in claim 6, wherein an additional said sound source is positioned on each side of said wall in the portion of said passageway in said bight portion so that each sub-passageway includes two said sound sources one at each of the opposite ends of said sub-passageways.

8. Earphone construction, as set forth in claim 2, wherein the surface of said passageway containing said first opening and the surface of said passageway containing said second opening are each in diverging relation to the surface of said passageway opposite thereto across the centerline of said tubular shaped member.

9. Earphone construction, as set forth in claim 2, wherein said sound sources are located at the ends of said legs spaced from said bight portion, and said U-shaped member at the opposite ends of said legs from said sound sources being perforated for forming sound outlet openings.

10. Earphone construction, as set forth in claim 2, wherein said legs are telescopically extendable.

11. Earphone construction, as set forth in claim 1, wherein said tubular shaped member is bent into a U-shaped configuration arranged to fit around the head of a listener, said U-shaped member consisting of a pair of legs and a bight portion interconnecting one end of each of said legs with a centerline extending through said legs and said bight portion, said passageway extending for the centerline length of said U-shaped member and having a portion thereof in each of said legs with a connecting portion within said bight portion joining the portions in each of said legs, the first end of said passageway located at the end of one of said legs spaced from said bight portion and the second end of said passageway located at the end of the other of said legs spaced from said bight portion, one of said legs having said first opening spaced between its ends and the other one of said legs having a second opening therein spaced between the ends thereof and arranged to be placed next to the other one of the listener's ears and one said sound source located in said passageway at each of the intersections of said legs and said bight portion with said sound sources positioned to direct the sound toward the opposite end of the leg with which it is associated.

12. Earphone construction, as set forth in claim 11, wherein the transverse cross section of the portion of said passageway through said bight portion increases from the midpoint thereof between said legs toward the intersections with said legs.

13. Earphone construction, as set forth in claim 11, wherein said U-shaped member at the opposite ends of said legs from said sound sources being perforated to form sound outlet openings.

14. Earphone construction, as set forth in claim 11, wherein said legs are telescopically extendable.

15. Earphone construction, as set forth in claim 1, wherein said tubular shaped member is bent into a U-shaped configuration arranged to fit around the head of a listener, said U-shaped member consisting of a pair of legs and a bight portion interconnecting one end of each of said legs with a centerline extending through each of said legs and said bight portion, said passageway extending for the centerline length of said U-shaped member and having a portion thereof in each of said legs and in said bight portion, the first end of said passageway located at the end of one of said legs spaced from said bight portion and the second end of said passageway located at the end of the other of said legs spaced from said bight portion, said one of said legs having said first opening spaced from its ends, the other of said legs having a second opening spaced between the ends thereof and arranged to be placed next to the other one of the listener's ears, at least one wall located within and extending transversely across said passageway within said bight portion between said legs and dividing said passageway into a pair of sub-passageways, one said sound source located within each of said sub-passageways and mounted on said wall located within said bight portion, each said sound source positioned to direct sound in the centerline direction of said sub-passageway within which it is located.

16. Earphone construction, as set forth in claim 15, wherein said legs are telescopically extendable.

17. Earphone construction, as set forth in claim 1, wherein said sound source is pivotally mounted in said passageway for selectively directing the sound from said sound source within said passageway.

18. Earphone construction, as set forth in claim 17, wherein said sound source is pivotally movable in said passageway about an axis extending transversely of the axis of said passageway through an angular range greater than 90°.

19. Earphone construction, as set forth in claim 1, wherein said sound source is located at said first end of said passageway and positioned for directing sound along the axis of said passageway, said tubular member being closed at the first and second ends of said passageway and said closed second end of said tubular member being perforated to form sound outlet openings.

20. Earphone construction, as set forth in claim 1, wherein one said sound source is located at each of said first end and said second end of said passageway and is positioned for directing sound along the axis of said passageway, said tubular member being closed at said first and second ends of said passageway, and said first and second ends of said tubular member being perforated to form sound outlet openings.

21. Earphone construction, as set forth in claim 1, wherein said tubular shaped member comprises a first tubular shaped section and a second tubular shaped section with said first and second tubular shaped sections being telescopically fitted together with one said sound source located within each of said first and second tubular shaped sections.

22. Earphone construction, as set forth in claim 1, wherein said tubular shaped member has a second opening formed therein which opening is spaced in the axial direction of said member from said first opening, and said sound source being removably mounted in said opening.

23. Earphone construction, as set forth in claim 22, wherein said tubular shaped member is formed of a resilient material so that said second opening defined by said resilient material can hold said sound source in form-fitting engagement.

24. Earphone construction, as set forth in claim 1, wherein said sound source is fitted into said first end of said tubular shaped member, and perforations formed through said tubular shaped member in a position located adjacent said second end of said tubular shaped member and on the opposite side of said first opening from said first end of said first tubular shaped member.

25. Earphone construction, as set forth in claim 24, wherein said sound source is positioned in said tubular shaped member for directing sound therefrom substantially perpendicularly to said first opening.

* * * * *